US007953739B2

(12) United States Patent
York et al.

(10) Patent No.: US 7,953,739 B2
(45) Date of Patent: May 31, 2011

(54) AUTOMATED DISCOVERY OF ITEMS ASSOCIATED WITH A CONTEXT BASED ON MONITORED ACTIONS OF USERS

(75) Inventors: Jeremy C. York, Seattle, WA (US); Robert Cottrell, Seattle, WA (US); Brent Smith, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 12/843,705

(22) Filed: Jul. 26, 2010

(65) Prior Publication Data
US 2010/0293474 A1 Nov. 18, 2010

Related U.S. Application Data

(63) Continuation of application No. 11/875,757, filed on Oct. 19, 2007, now Pat. No. 7,779,014, which is a continuation of application No. 10/286,430, filed on Oct. 30, 2002, now Pat. No. 7,295,995.

(60) Provisional application No. 60/336,235, filed on Oct. 30, 2001.

(51) Int. Cl.
G06F 7/00 (2006.01)
G06F 17/30 (2006.01)
(52) U.S. Cl. .................. 707/749; 707/748; 707/751
(58) Field of Classification Search .................. 707/749, 707/999.001–999.005
See application file for complete search history.

(56) References Cited

U.S. PATENT DOCUMENTS

| 4,870,579 A * | 9/1989 | Hey | 705/27 |
|---|---|---|---|
| 4,996,642 A * | 2/1991 | Hey | 705/27 |
| 5,446,891 A | 8/1995 | Kaplan et al. | |
| 5,749,081 A * | 5/1998 | Whiteis | 1/1 |
| 5,754,938 A | 5/1998 | Herz et al. | |
| 5,758,257 A * | 5/1998 | Herz et al. | 725/116 |
| 5,790,935 A * | 8/1998 | Payton | 725/91 |
| 5,825,651 A | 10/1998 | Gupta et al. | |
| 5,848,396 A | 12/1998 | Gerace | |
| 5,974,412 A * | 10/1999 | Hazlehurst et al. | 1/1 |

(Continued)

FOREIGN PATENT DOCUMENTS

WO 95/29451 A1 11/1995

(Continued)

OTHER PUBLICATIONS

Ungar, L. H., and Foster, D. P. (1998) Clustering Methods for Collaborative Filtering. In Workshop on Recommender Systems at the 15th National Conference on Artificial Intelligence.*

(Continued)

*Primary Examiner* — Mohammad Ali
*Assistant Examiner* — Kannan Shanmugasundaram
(74) *Attorney, Agent, or Firm* — Knobbe, Martens, Olson & Bear LLP

(57) ABSTRACT

Computer processes are disclosed for automatically refining the order and/or content of context-specific lists of items (e.g., products) based on monitored actions of users. One such process involves outputting context-specific lists of items to users together with selectable controls for initiating displays of similar items. When users opt to view similar items, the users' actions performed in connection with the similar items are recorded. If the resulting level of user activity recorded for a particular similar item is sufficiently high, the item is automatically added to the associated context-specific list.

24 Claims, 5 Drawing Sheets

U.S. PATENT DOCUMENTS

| | | | |
|---|---|---|---|
| 6,016,475 A * | 1/2000 | Miller et al. | 705/7 |
| 6,029,195 A | 2/2000 | Herz | |
| 6,061,057 A * | 5/2000 | Knowlton et al. | 715/744 |
| 6,064,980 A * | 5/2000 | Jacobi et al. | 705/26 |
| 6,085,229 A | 7/2000 | Newman et al. | |
| 6,092,049 A * | 7/2000 | Chislenko et al. | 705/10 |
| 6,112,186 A * | 8/2000 | Bergh et al. | 705/7.32 |
| 6,185,558 B1 | 2/2001 | Bowman et al. | |
| 6,256,633 B1 | 7/2001 | Dharap | |
| 6,266,649 B1 | 7/2001 | Linden et al. | |
| 6,317,722 B1 * | 11/2001 | Jacobi et al. | 705/14.51 |
| 6,334,127 B1 | 12/2001 | Bieganski et al. | |
| 6,438,579 B1 * | 8/2002 | Hosken | 709/203 |
| 6,466,970 B1 | 10/2002 | Lee et al. | |
| 6,493,702 B1 | 12/2002 | Adar et al. | |
| 6,513,036 B2 * | 1/2003 | Fruensgaard et al. | 1/1 |
| 6,606,102 B1 | 8/2003 | Odom | |
| 6,611,814 B1 * | 8/2003 | Lee et al. | 705/26 |
| 6,664,980 B2 * | 12/2003 | Bryan et al. | 715/738 |
| 6,697,824 B1 * | 2/2004 | Bowman-Amuah | 709/229 |
| 6,804,662 B1 * | 10/2004 | Annau et al. | 1/1 |
| 6,901,378 B1 | 5/2005 | Linker et al. | |
| 6,912,505 B2 | 6/2005 | Linden et al. | |
| 7,031,961 B2 | 4/2006 | Pitkow et al. | |
| 7,089,237 B2 | 8/2006 | Turnbull et al. | |
| 7,295,995 B1 | 11/2007 | York et al. | |
| 2001/0014868 A1 | 8/2001 | Herz et al. | |
| 2002/0038254 A1 * | 3/2002 | Koike | 707/3 |

FOREIGN PATENT DOCUMENTS

| | | |
|---|---|---|
| WO | 99/41694 A1 | 8/1999 |
| WO | 00/17792 A1 | 3/2000 |

OTHER PUBLICATIONS

R. Kohavi, "Mining E-Commerce Data: The Good, the Bad, and the Ugly," Proceedings of the Seventh ACM SIGKDD International Conference on Knowledge Discovery and Data Mining, pp. 8-13, ACM Press 2001.

J. Andersen, A. Giversen, A. Jensen, R. Larsen, T. Pedersen and J. Skyt, "Analyzing Clickstreams Using Subsessions," Proceedings of the Third ACM International Workshop on Data Warehousing and OLAP, pp. 25-32, ACM Press 2000.

B. Mobasher, R. Cooley and J. Srivastava, "Automatic Personalization Based on Web Usage Mining," Communications of the ACM, vol. 43, Issue 8, pp. 142-151, dated Aug. 2000.

S. Middleton, D. De Roure and N. Shadbolt, "Capturing Knowledge of User Preferences: Ontologies in Recommender Systems," Proceedings of the International Conference on Knowledge Capture, pp. 100-107, ACM Press 2001.

D. Widyantoro, T. Loerger and J. Yen, "An Adaptive Algorithm for Learning Changes in User Interests," Proceedings of the Eighth International Conference on Information Knowledge Management, pp. 405-412, ACM Press 1999.

K. Yu, X. Xu, M. Ester and H. Kriegel, "Selecting Relevant Instances for Efficient and Accurate Collaborative Filtering," Proceedings of the Tenth International Conference on Conference on Information and Knowledge Management, pp. 239-246, ACM Press 2001.

Marc Langheinrich et al., "Unintrusive customization techniques for Web advertising," Proc. of the Eighth International Conference on World Wide Web, published in Computer Networks 31, pp. 1259-1272, May 1999, Toronto, Canada.

Patrick Baudisch and Dirk Leopold, "User-configurable advertising profiles applied to Web page banners," Proc. of the First Berlin Economics Workshop (Berlin, Germany, Oct. 1997).

* cited by examiner

AUTOMATED DISCOVERY OF ITEMS ASSOCIATED WITH A CONTEXT BASED ON MONITORED ACTIONS OF USERS

PRIORITY CLAIM

This application is a continuation of U.S. application Ser. No. 11/875,757, filed Oct. 19, 2007 now U.S. Pat. No. 7,779, 014, which is a continuation of U.S. application Ser. No. 10/286,430, filed Oct. 30, 2002 (now U.S. Pat. No. 7,295, 995), which claims the benefit of U.S. Provisional Application No. 60/336,235, filed Oct. 30, 2001. The disclosures of the aforesaid applications are hereby incorporated herein by reference.

BACKGROUND OF THE INVENTION

1. Field of the Invention

This invention relates to data processing methods for adaptively refining the order and/or content of a list of items based upon the monitored actions of one or more users who access the list.

2. Description of the Related Art

One problem in the field of data processing and electronic catalogs is that of assisting users in efficiently locating items that are the most likely to be of interest. For example, when a web site displays a list of recommended items to a user, it would be desirable to present the list so as to include and emphasize those items that are the most likely to be of interest to the user given the particular context of the user.

One technique to address this problem involves presenting those items that, based on an analysis of browsing data, are or have recently been the most popular among a population of users. However, unless the user is able and willing to present feedback regarding the relevance of the presented items, these lists tend to be static and ineffective, particularly for users with specialized interests.

Another problem for online merchants is an inability to effectively target their marketing directly to those consumers who would be most interested in particular products. For example, existing product recommendation services tend to be effective only after an accurate profile of a particular consumer's interests has been developed. Thus, it may be difficult or impossible for a system that uses conventional recommendation algorithms to provide meaningful product recommendations to new customers or customers for which little information is known. Therefore, there is a continued need for ways to prioritize displays of items within an electronic catalog.

SUMMARY

The invention comprises a system and method for ranking and presenting a list of items such that the items likely to be of greatest interest to a user viewing the list are presented first, or are otherwise displayed more prominently. The invention also includes methods for adaptively refining the contents of a list over time based on the actions of those who view the list. The invention is applicable to environments in which multiple users have access to a catalog or other repository of browsable items, including but not limited to products that are available for purchase.

In one particular embodiment, the lists are context-specific lists of recommended items (e.g., a list of suggested gifts for movie buffs). The orderings of such lists, and optionally the contents of the lists, are adaptively refined over time based on monitored actions performed by those who view the lists. In another embodiment, the lists are static-content lists, such as a list of all items falling within a particular item category.

On particular feature of the disclosed system involves outputting context-specific lists of items to users together with selectable controls for initiating displays of similar items. When users opt to view similar items, the users' actions performed in connection with the similar items are recorded. If the resulting level of user activity recorded for a particular similar item is sufficiently high, the item is automatically added to the associated context-specific list.

BRIEF DESCRIPTION OF THE DRAWINGS

A preferred embodiment of the invention will now be described with reference to the drawings summarized below. Throughout the drawings, reference numbers are re-used to indicate correspondence between reference elements.

DETAILED DESCRIPTION OF THE PREFERRED EMBODIMENTS

A preferred embodiment will now be described and illustrated in which the system and associated methods are implemented using HTML (HyperText Markup Language) encoded web pages of a web site. As will be recognized, the invention may also be implemented using other types of multi-user interactive systems, including web sites that use other markup languages, online services networks that use proprietary data formats (e.g., America Online and MSN), and systems in which users browse and make purchases by voice.

Throughout the description, reference will be made to various implementation-specific details. These details are provided to fully illustrate a specific embodiment of the invention, and not to limit the scope of the invention. The various processes described herein are preferably performed by using software executed by one or more general-purpose computers. The processes could alternatively be embodied partially or entirely within special purpose hardware without altering the fundamental system described.

In particular, a "module" as used herein, may refer to any combination of software, firmware, or hardware used to perform the specified function or functions. The modules described herein are preferably implemented as software modules, but may be represented partially or entirely in hardware or firmware. It is contemplated that the functions performed by these modules may also be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless network, such as the Internet.

Although the items in the various embodiments described below are products, it will be recognized that the disclosed methods are also applicable to other types of items, such as documents, authors, musical artists, restaurants, chat rooms, other users, links to other web sites, web pages, or lists of items in a particular category.

1. Overview

The system and method described herein is designed to modify lists of items that are viewed by users of a website based on the context of each user at that website. "Context" is described in further detail herein, but may be considered to be the particular task the user is attempting to complete or a particular frame of mind of the user. By modifying lists of items to display items that are most likely to be of the interest to the user in the particular context of the user, the user is presented with more relevant items and is therefore more likely to make purchases at the website. A preferred method and system to develop and update such context driven lists is described herein.

Figure 1A:
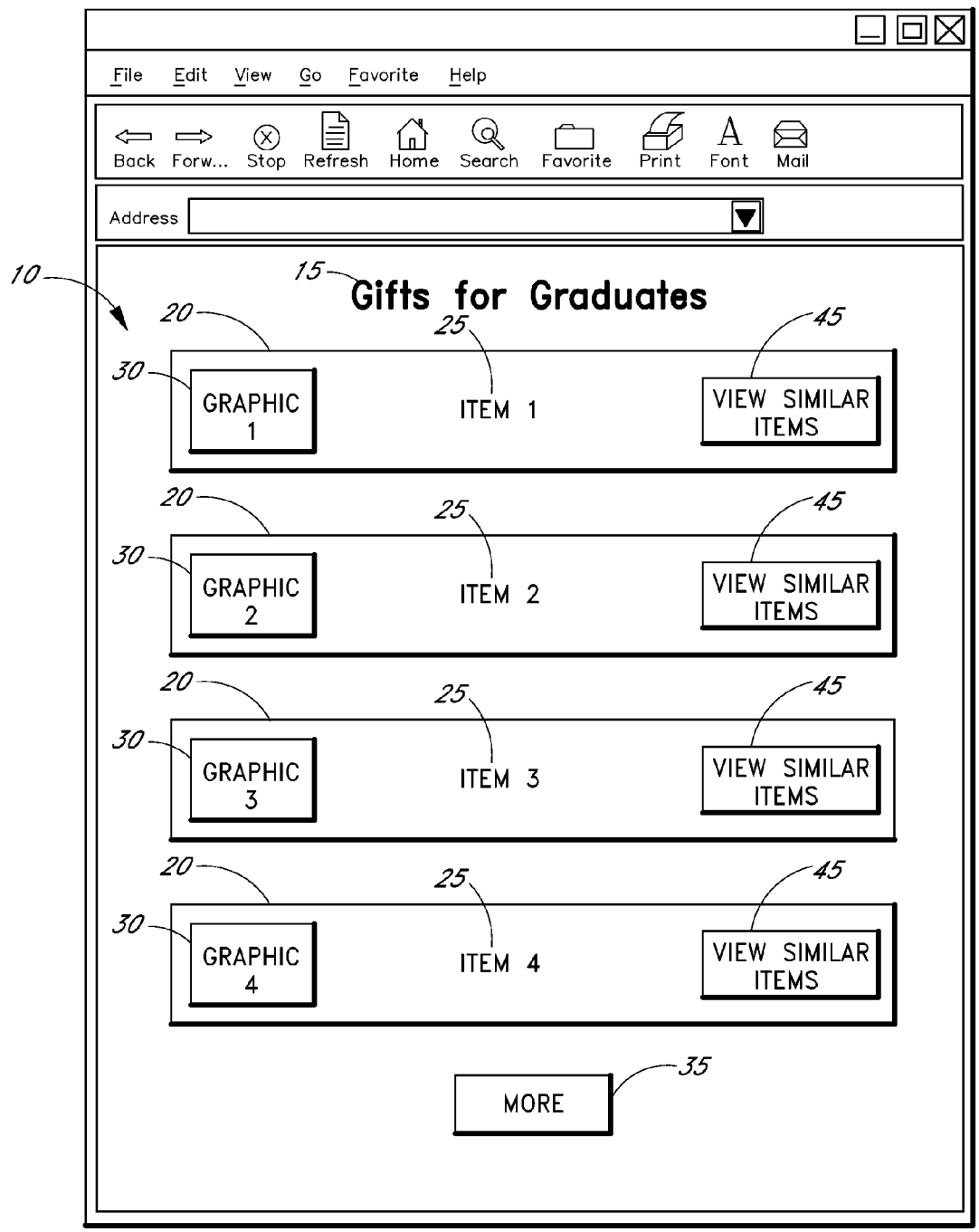
FIG. 1A illustrates a schematic representation of a display page presented by a web server.

FIG. 1A depicts a sample list 10 that might be generated by a web server for display to a user when visiting a vendor's web site. In this example, the list 10 is a list of gifts suitable for graduates as indicated by the title 15 of the list. List 10 contains four items 20, labeled 'Item 1' to 'Item 4'. Each item may include a label 25 or other identifying information about the item 20, as well as a picture or other graphic 30. Those skilled in the art will recognize that a greater or lesser amount of information may be provided about each item 20 on the list, and that the particular information provided may vary depending on the nature of the item itself. For instance, if the item 20 represents a book, then the information provided may include a picture of the cover of the book as the graphic 30, and the title and a brief summary of the book associated with the label 25. If the item is a CD of recorded music, the graphic 30 might represent the album cover art, and the information might include the artist and title of the album.

The list 10 may also provide access to one or more additional pages that provide detail about each item 20 displayed. In FIG. 1A, the detail information is made available by clicking upon the item itself. Alternatively, a button (not illustrated) may be provided to access the page or pages containing additional detail information (hereinafter referred to as a detail view or detail page). The content of the detail pages may vary depending upon the nature of the item. For instance, a detail page associated with an item 20 that is a book might include a brief summary of the book, reviews, publication information, an excerpt or any other information one might associate with a book. For a music CD, the detail page might provide track listings, audio samples, and so forth. Detail pages may also include one or more other lists in addition to the detailed information about the item.

Although a list 10 may include any number of items 20, a single display page is usually constrained to display only a limited number of items at any one time. In FIG. 1A, only the first four items 20 of the list 10 are displayed on the page. In order to access other list items, the user selects a "More" button 35 that displays the next items in the list of items. In subsequent pages, a 'Back' button (not illustrated) may be provided to return to the previously displayed items. In this manner, a user may scroll backwards and forwards in the list to view all items in the list.

In addition to providing access to the items of a particular list, the list 10 may also include one or more links or buttons 45 that allow a user to view items that are similar or related to a selected item 20 on the list. Such 'View Similar Items' buttons 45 are shown for each item 20 displayed in the list 10. An option may also be provided (not shown) to view items that are collectively similar to all, or a selected subset, of the items in the list. Selecting the 'View Similar Items' button 45 for any particular item 20 or group of items will generate a new display page containing a different list of items ("similar items"). The list of similar items for a selected item 20, or for a selected group of items, may optionally be generated using the methods disclosed in U.S. Pat. No. 6,266,649 and published U.S. Application US 2002/0019763 A1, the disclosures of which are hereby incorporated by reference. For example, the lists of similar items may be based on item viewing histories of users (e.g., items A and B are similar because a significant portion of those who viewed A also viewed B), item purchase histories of users (e.g., items A and B are similar because a significant portion of those who bought A also bought B), and/or another type of user activity.

As noted above, it is desirable to order the items 20 displayed in the list 10 such that those items likely to be of the most interest to someone viewing the list appear earlier in the list. In general, by presenting items to users for which there is greater interest, more sales will be made through the web site. Presenting items of interest to users, however, is more than simply presenting the overall bestsellers to the user. For example, even though a particular item may be particularly popular among classical music aficionados, that item overall is likely to be much less popular than a new pop album by a current singing sensation. Furthermore, the classical music items that are most popular among classical music aficionados may not be the best selling items among classical music items overall. For instance, the general public may purchase a fairly large number of recordings of Beethoven's Fifth Symphony, while among classical music fans, recordings of Mozart's Requiem may outsell Beethoven's Fifth.

By knowing the context in which a visitor's activity occurs, it becomes possible to identify preferences associated with each context and present choices to users that are more likely to result in sales based upon each context. For example, if a user is operating in a context which is recognized to be that of a classical music fan, a recommendation of Mozart's Requiem will generally result in greater sales and related activity than a recommendation of Beethoven's Fifth Symphony. However, if a user is operating in the context of a general purchaser who is not a classical music fan, the Beethoven recommendation may generally result in better sales activity.

A user's context is typically that of the list currently being requested. For example, whenever a user requests a list associated with classical music, the user may be treated as falling within a "classical music fan context." Thus, for example, the system may include many different browsable lists, each of which is statically assigned to a particular context.

Figure 1B:
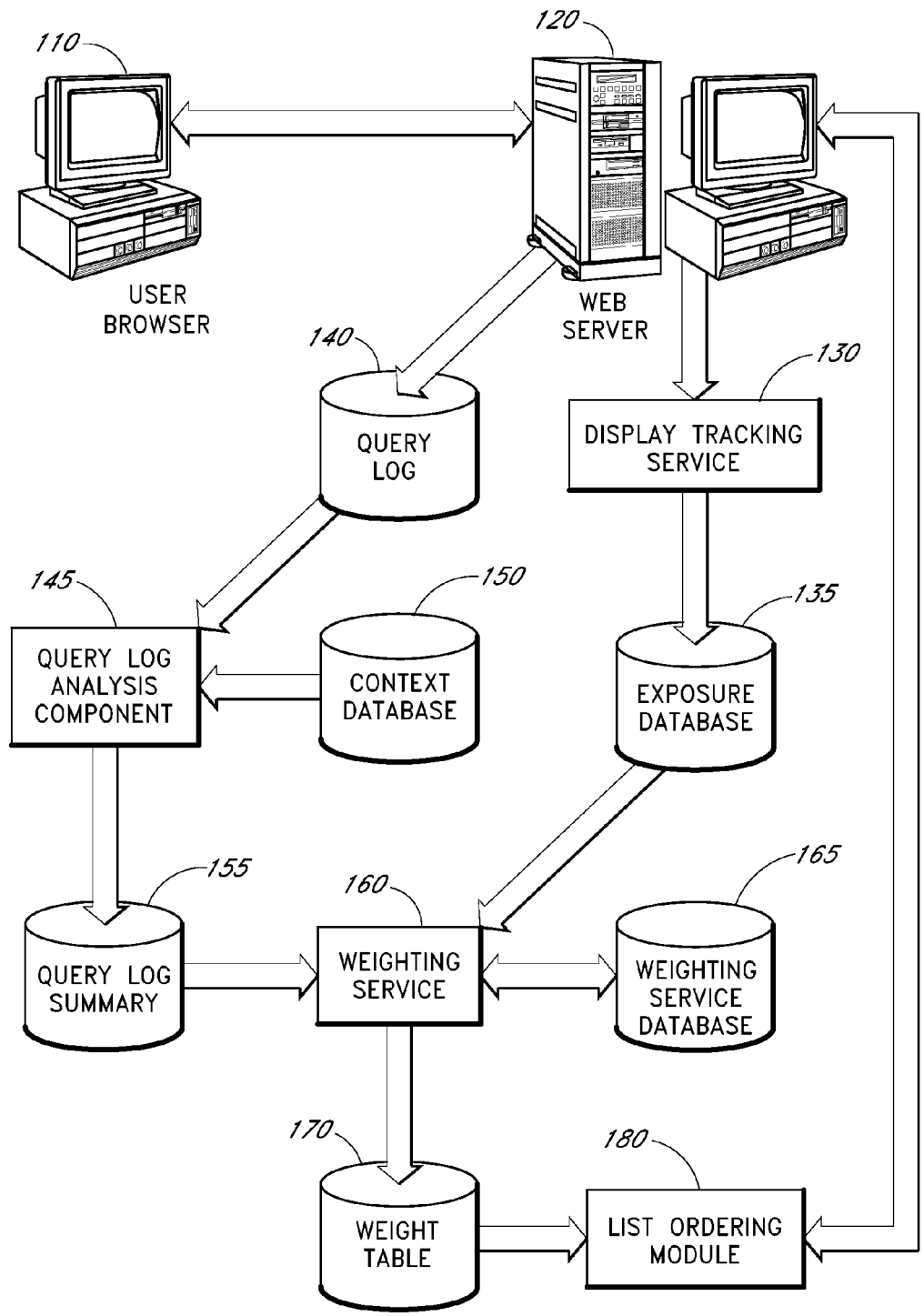
FIG. 1B illustrates a schematic representation of the components and data storage for one preferred embodiment of a list ordering system.

FIG. 1B depicts a preferred embodiment of a list ordering system 100 that includes a display tracking service 130, a query log analysis service 145, a weighting service 160, and a list ordering module 180. The operation of each service or module is discussed in more detail below. In the preferred embodiment, the list ordering system 100 is a web-based sales system in which items for purchase are presented to a user via a web browser and may be ordered directly from the web site. It will be appreciated that the system and methods disclosed herein are equally applicable to other environments, however, including a wireless device network, a sales kiosk, or another type of multi-user interactive system.

As shown in FIG. 1B, a browser 110 is used by a user to make a request for a web page from one or more web servers 120 that operate a vendor's web site. A web page is generated by the web server 120 in response to the user's request. The page generated by the web server may include static HTML data, data that is generated by server side scripts, data read from other sources based upon input provided by the browser 110, and such other types of data for web pages as are known to those of skill in the art. In particular, the web page may include a list of items that fit some criteria that was specified in the request by the user. For example, the list of items may include the content of a particular portion of on online store, a specialized set of items associated with a particular user or group of users, or search results. As will be described in additional detail below, the order of the items within the list is generated by the list ordering module 180 to take the context into account and display those items at the top of the list that are more likely to be of greater interest to the user.

2. Generation of Activity and Exposure Data

When a web page is served to a user by the web server 120 and the user navigates through the website, two services are used to gather information about the user's visit to the website. First, a query log 140 and a query log analysis service 145 are used to generate an activity database 155 that contains a record of the user's interaction with the website. Second, a display tracking service 130 is used to generate an exposure database 135 that contains a record of how often an item is displayed in a particular context. Each service will be discussed in turn below.

As a user navigates the website, such as by traversing a catalog or sending requests for searches to the web server 120, the pages served to the user and the user's actions are stored in one or more query logs 140. The query logs are files or databases that contain a summary of the user's interaction with the website, for example, navigation decisions by the user, inquiries made by the user, links selected by the user, and additional information related to the activity of the user (e.g., dwell times on particular pages). Note that the activity that is stored in the query log may depend on the type of item viewed by the user and the path the user took to arrive at the particular item. For instance, if a user either searched for or traversed a catalog hierarchy to arrive at a specific author, then the activity that is stored in the query log may include both the path the user took to get to the author, as well as the activities of reading of reviews of the author's work, viewing detailed pages of the books by the author, or submitting a user review for a work by that author.

In a preferred embodiment, each record in the query log 140 preferably identifies the particular context, followed by a list of items viewed or otherwise acted upon by the user, as identified by the clicks, selections, or other user action performed in that context. Each query log record may also list some or all of the pages viewed during that user's session, in which case a look up table may be used to convert page identifiers to item or product identifiers. For purposes of this description, "context" refers generally to the particular task the user is attempting to complete or a particular frame of mind of the user. Contexts are typically, but not exclusively, defined by a series of one or more actions that a user takes before arriving at an ordered list, and/or by a name or other identifier of the list (e.g., "gifts for graduates"). For example, a user that answers a series of questions about a type of gift that they are searching for may arrive at a page similar to that depicted in FIG. 1A. A sample context in this case might be "gifts for 10-12 year old boys that like sports"—the context determined by the responses of the user to a series of questions or by a browse hierarchy that led the user to this context. As an additional example, each list may be accessed via a respective link that specifies that list's context, such as "gifts for graduates" or "gifts for music buffs." Each context is typically defined by the operator of the web site, and a unique alphanumeric code assigned to each context to distinguish one context from another context. Contexts are stored in a context database 150 and used by the various services of the system as described herein. The number of contexts associated with each website will obviously vary depending on the website, and may range into the thousands or higher.

The query log 140 is periodically accessed by a query log analysis service 145. The query log analysis service 145 analyzes the activity that has taken place with respect to items in contexts of interest to the website operator. In a preferred embodiment, the query log analysis service analyzes one or more query logs 140 and generates an activity database 155 that contains a summary of activity data associated with each context and each item. In a preferred embodiment, the query log analysis service is a Perl script that is run periodically (e.g., once a day) on the list ordering system 100. Alternatively, the query log analysis service may rely on an underlying database to access the data.

The query log analysis service 145 scans the query logs 140 looking for one or more of the contexts listed in the context database 150. For each of the searched contexts from the context database that is found in the query log 140, the analysis service generates a list of the individual items associated with that context, as well as the activity associated with each of these items. This information is output to an activity database 155 that stores, for each context, the list of items and the activity associated with each item. Data associated with contexts not listed in the context database 150 are not analyzed and summarized by the query log analysis service 145.

Figure 2:
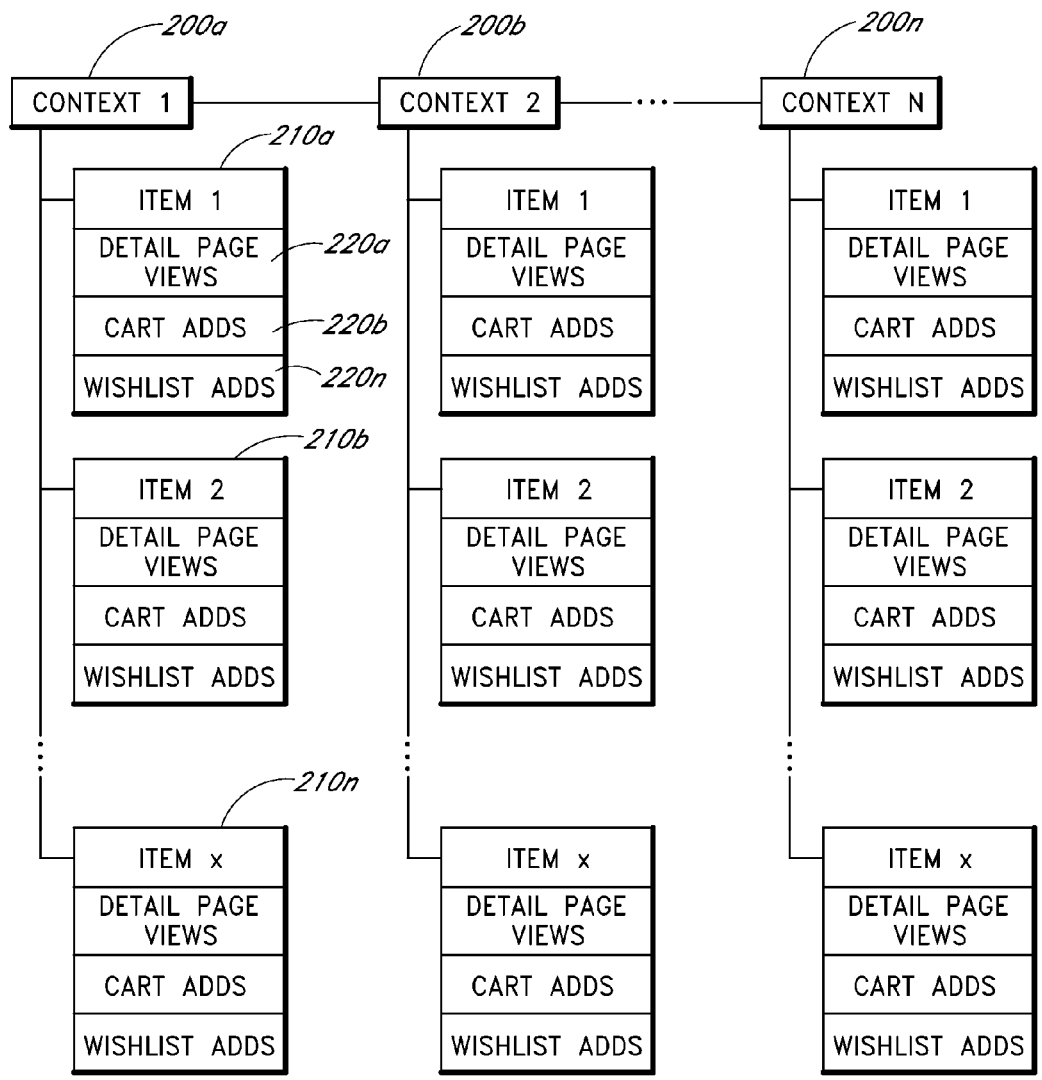
FIG. 2 illustrates a data structure for the activity database in one preferred embodiment of the system of FIG. 1B.

FIG. 2 shows a preferred embodiment of a structure for the activity database 155. The activity database is a database of how often an activity is performed pertaining to a particular item in a given context. The structure is a table containing each context 200a, 200b ... 200n that has been analyzed by the query log analysis service. Associated with each context are one or more items 210a, 210b ... 210n. The particular number of items associated with each context will depend upon the number of times that an item was shown in that context during the period of time for which the query log 140 was recording activity data. Each context 200a, 200b ... 200n may therefore have more or less items associated with it than other contexts. Associated with each item 210a, 210b ... 210n are activities 220a, 220b ... 220n. Each activity indicates an action (and by inference, a level of interest) that the user took with respect to the item in each particular context. For example, in the embodiment depicted in FIG. 2, activity 220a is viewing of a detailed page of information about the item, activity 220b is adding the item to a shopping cart, and activity 220n is adding the item to a wishlist. Other activities that could be monitored, for example, include the purchase of the item, the user writing a product review of the item, the user requesting to view other items similar to the currently-viewed item, the user signing up for a mailing list pertaining to the item, or any other type of action. The activity field is simply a numeric count of the number of times that the activity was performed for that particular object and context, e.g., the number of times that an Isaac Asimov book was added to a shopping cart while viewing a list of gifts for science fiction fans. It will be appreciated that a greater or lesser number of activities may be stored in the activity database depending on the type of activities that the web site operator would like to track. Moreover, because different types of activities may be tracked for different types of items, the number of activities associated with each item 210a, 210b ... 210n may well be different from the number of activities associated with other items.

It will be appreciated that items 210a, 210b ... 210n are not necessarily limited to products for sale. Items may also represent lists, authors, related web sites and other types of features or widgets that a user may show an interest in. While such items cannot generally be added to wish lists or shopping carts, other activities associated with such items may be used to indicate an interest of a user in the item in a particular context. For instance, if one item represents a list created by a particular user of her favorite books, a request by a user to mail the list to a friend may indicate the pertinence of the list to the particular context.

Although a particular data organization is shown in FIG. 2, those skilled in the art will recognize that the organization shown may be implemented using a variety of different data structures. For instance, the data might be organized as a multiply linked list where each box in FIG. 2 represents a node of the list. Alternately, the data might be placed in a database having fields in each record for each of the noted data entries. A flat file could also be used which simply lists each identifier shown in FIG. 2 followed by the appropriate data value and a delimiter. It will also be appreciated that more than one activity database 155 may be created by running multiple query log analyses on separate query logs producing independent output.

Returning to FIG. 1B, the second service that is used to gather information about a user's visit to the website is a display tracking service 130 that is used to generate an exposure database 135. The exposure database 135 contains information about how often items are displayed in a particular context, regardless of whether any user activity was generated by such display. Each time a display page is generated by the web server 120 for display to a user, the web server provides a message to the display tracking service 130 that indicates the context (which may, but need not, be in the form of a list title or ID), and a list of the items that are displayed to the user. This data is stored in the exposure database 135, indexed by a key that indicates both context and item identifier. Each time a particular item is presented in a particular context, the count for the corresponding context-item key is incremented to indicate an additional exposure. The exposure database is constantly being updated by the display tracking service 130 and therefore provides an aggregate and anonymous summary of item displays in each context. The display tracking service may be implemented in a preferred embodiment as a process that receives messages sent to it from a web server 120 or any other system that is preparing or sending web pages to the user's browser 110.

In some embodiments it may be desirable to use multiple display tracking services 130 running on separate computing devices or servers. When this is the case, the individual data produced by the separate display tracking services may be combined into a single exposure database 135 at a variety of levels. For instance, each of the display tracking services 130 may load data into the same database 135 in order to produce a single database with the information from all of the various tracking services. In an alternative arrangement, the data from the separate display tracking services may be loaded into separate databases and aggregated at a later time. Moreover, the data from the display tracking services need not even be aggregated at all except when processed by the weighting service 160.

Although the term "viewing" is used herein to refer to the act of accessing product information, it should be understood that the user does not necessarily have to view the information about the product. Specifically, some merchants support the ability for users to browse their electronic catalogs by voice. For example, in some systems, users can access voiceXML versions of the site's web pages using a telephone connection to a voice recognition and synthesis system. In such systems, a user request for voice-based information about a product may be treated as a product viewing event.

3. Generation of Item Weights

Once the activity database 155 and exposure database 135 have been populated, the weighting service 160 may calculate a significance factor, or "weight," to be assigned to a particular item in a particular context. The weighting service 160 periodically accesses the activity database 155, the exposure database 135, and the weighting database 165 in order to calculate such weights. As will be described in additional detail below, the weight of each item is used to select which items to display to users and the order of the items for display.

Figure 3:
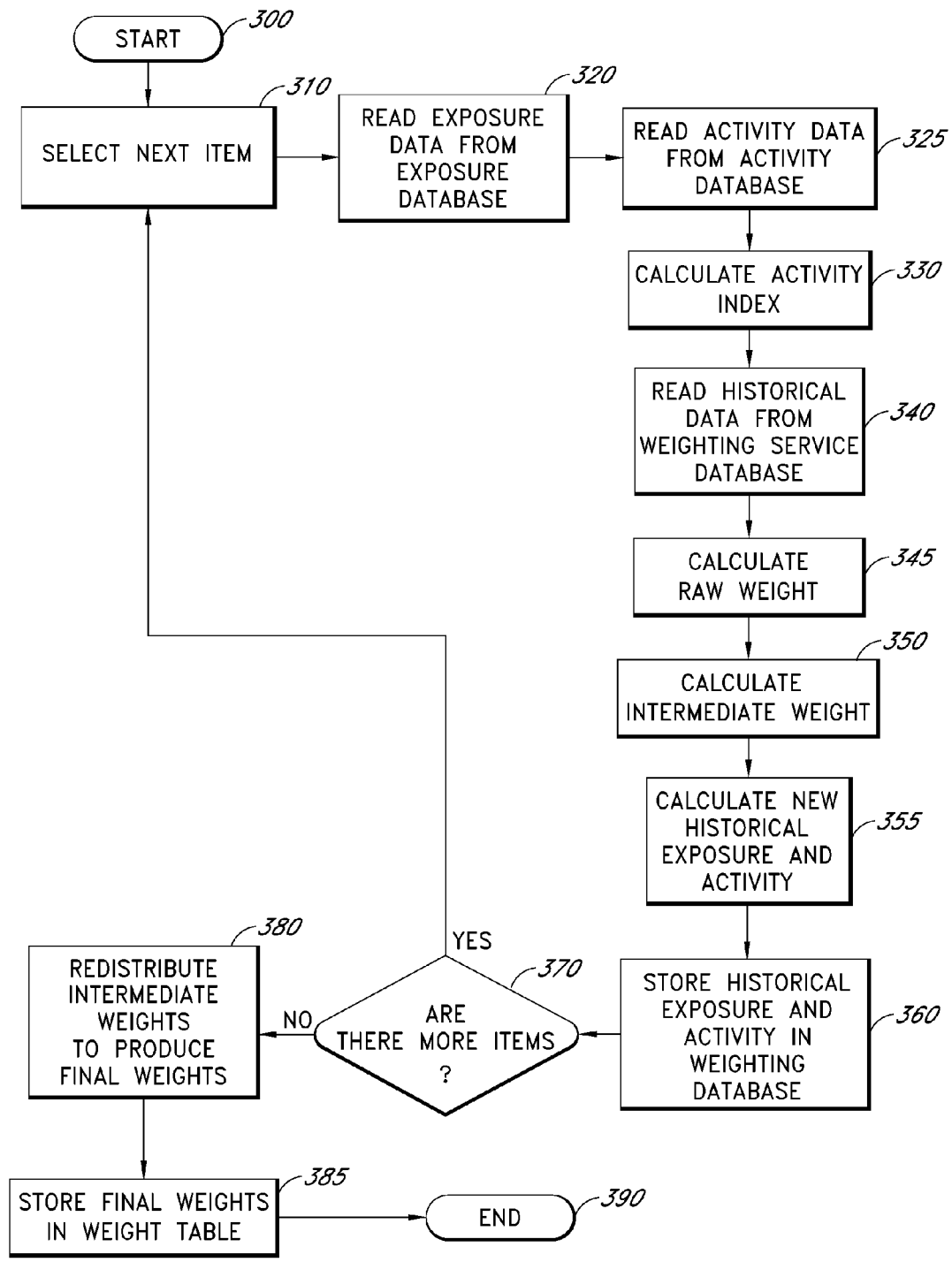
FIG. 3 illustrates one embodiment of a technique for generating the weights of individual items by the weighting service of FIG. 1B.

One preferred embodiment of the weighting service 160 for calculating a weight for an item within a particular context is shown in FIG. 3. The general process comprises taking certain historical data for the weight of a given item within a given context, taking recent exposure and activity data for the item, and performing a set of calculations to update the weight of the item. The routine depicted in FIG. 3 is repeated each time a different context is analyzed.

The weighting service 160 begins by identifying the item that is to be analyzed at a step 310. At a step 320, a current exposure index ($E_{current}$), is determined by accessing the exposure database 135 to determine how often the item has recently been displayed to users in the selected context. At a step 325, recent activity data associated with the item in the selected context is retrieved from the activity database 155. At a step 330, a current activity index ($A_{current}$) is calculated by summing the product of the quantity of each type of activity tracked and a factor associated with that type of activity. If, for example, the activities tracked for an item included the number of detail page views for the item (DV), the number of times the item was added to a wish list (WL), the number of times the item was added to a shopping cart (SC), and the number of times the item was actually purchased (PC), and if the activity factors applied to these four types of activities (DV, WL, SC, and PC) are respectively 1, 5, 10 and 15, then the current activity index for this context/item combination is calculated as follows:

$$A_{current}=(1 \cdot DV)+(5 \cdot WL)+(10 \cdot SC)+(15 \cdot PC) \qquad \text{(Eq. 1)}$$

Individual activity factors are desirably assigned to each type of activity that is tracked by the system and used in the calculation of the current activity index. The particular values of the activity factors are assigned so as to approximate the relative importance of the corresponding activity as an indication of an interest level of the user in the item. For instance, in the example given, the activity factor for wish list adds (5) is five times greater than the activity factor for detail views (1), based on the assumption that adding an item to a wish list generally indicates a much stronger level of interest than merely viewing the detail page describing an item. The activity factors may be assigned by analyzing historical data, or may be assigned based upon market research or any other criteria known to those of skill in the art.

After the current exposure and activity indexes are determined, at a step 340 the weighting service 160 loads the historical exposure index ($E_{historical}$) and activity index ($A_{historical}$) from the weighting database 165. The weighting database contains the last-calculated value of the exposure index and the activity index for each context/item combination. In a preferred embodiment, the weighting database 165 comprises a flat file containing the context/item identifier and the associated exposure index and activity index. For new items, i.e., items that have no historical activity or exposure index associated with their display in a particular context, a technique is described in further detail below for providing a seeded value to ensure that the new item is ultimately exposed in lists.

Once the current and historical exposure and activity indices are calculated and loaded, new versions of each of the indices are calculated in accordance with the following equations:

$$A_{new} = A_{current} + \alpha A_{historical} \quad (Eq. 2)$$

$$E_{new} = E_{current} + \alpha E_{historical} \quad (Eq. 3)$$

where α (alpha) is a constant that represents the decay rate of historical data. Alpha is a value between 0 and 1 and is used to cause the historical data to be less significant in the calculation than the current data, thereby preventing early exposure and activity data from having undue significance over a period of time. In a preferred embodiment of the system, the value of alpha is approximately 0.99 to provide for a slow decay of the significance of historical values. For conditions in which a faster decay rate is desirable, a lower alpha value may be used. Faster decay rates are typically more appropriate for items that are seasonal in nature (for instance, holiday items), or for items that are known to be fashionable for only limited periods of time.

In an alternate embodiment, it may be desirable to use different alpha values for different context/item combinations, or for different categories of context/item combinations. For instance, a lower alpha value could be applied to all items in contexts that were known to represent seasonal or highly volatile markets. These individual alpha values could be stored in the weighting database 165 along with the historical exposure and activity indices for a given context/item combination if so desired. Those skilled in the art will recognize that alternate techniques to ensure that the effects of historical data are lessened over time may also be used.

Once the new exposure and activity indices have been calculated, at a step 345 the raw weight is calculated based upon the following equation:

$$W_{raw} = A_{new}/E_{new} \quad (Eq. 4)$$

The raw weight essentially represents the expected activity score that will occur when an item is displayed in a particular context. An adjustment factor must then be applied to the raw weight in order to prevent items that are only displayed a few times, but which were purchased by several of these users, from having unreasonably high weights. This circumstance may result in particular when a particular obscure item is searched for directly because a consumer knows he/she intends to purchase the item. At a block 350, an intermediate weight is therefore calculated by multiplying the raw weight by an adjustment factor as follows:

$$W_{int} = W_{raw}\left(1 - \frac{1}{\sqrt{E}}\right) \quad (Eq. 5)$$

The use of the adjustment factor is based on the premise that activity on items having greater exposure is more reliable than activity on items having less exposure. Those skilled in the art will appreciate that other techniques may be used to create an adjustment factor having a similar effect.

After calculating the intermediate weight, at blocks 355 and 356 the historical exposure and activity indices are updated and stored in the weighting database 165. In the preferred embodiment of the weighting service, the new values of the exposure index ($E_{new}$) and activity index ($A_{new}$) are stored in the weighting database and used as the historical values in the next round of calculations. Those skilled in the art will recognize that a variety of techniques may be used to manipulate the new index values prior to storing as historical index values. Other possibilities include multiplying the new values by a constant prior to storing, or taking a weighted average between the new indices and the historical indices.

At a step 370, if there are additional items present in the activity database for the context being analyzed, the weighting service 160 returns to step 310 to select the next item and proceeds to repeat the described procedure for each of the identified items. When all of the items have been processed for a particular context and an intermediate weight has been determined for each of the items, at a step 380 the resulting intermediate weights are linearly redistributed to produce a final weight between 0 and 999 in accordance with the following equation:

$$W_{final} = W_{int}\frac{999}{W_{max}} \quad (Eq. 6)$$

where $W_{max}$ is equal to the largest intermediate weight for any item within the context. In this way, the range of final weights that the list generating component must process preferably falls within a consistent range regardless of the range of the actual weights produced, simplifying the processing required when generating lists in real time. At a step 385, the final weights are stored in a weight table 170 that correlates the context/item with the final weight.

In a preferred embodiment, the weighting service runs approximately once a day, preferably after completion of the analysis by the query log analysis service 145. In this way, new weights are generated for items in various contexts in response to the updated activity database 155. The weighting service may also be run more often if the activity database 155 is generated more frequently.

It will be appreciated that for new items added to a catalog, there will be no current or historical activity or exposure index associated with the display of the item in a particular context. When such information is lacking and a final weight cannot be calculated, an estimated final rank can be applied to the item. In one embodiment, a new item is assigned an estimated final weight of between 450 and 550 depending on the initial sales rank of the product as measured against other comparable products sold by the website operator (a higher sales rank pertaining to a weight of 550 and a lower sales rank pertaining to a weight of 450). Adding a new product with a final weight that falls in the middle of the weight range ensures that new products are not introduced into lists at a disproportionately high level, while at the same time ensuring that the item does not fail to be exposed on a list because it has a weight that is too low. Those skilled in the art will appreciate that numerous other techniques for introducing new items may also be applied, including varying the range or correlation with the sales rank, randomly assigning weights, assigning weights based on subjective item importance, and assigning weights in accordance with other website operator objectives.

4. List Ordering Module

The weights as determined by the weighting service 160 are used by the web server 120 to order lists of items for display in a user's browser 110. The web server 120 receives requests from a user's browser 110 or other system for accessing the contents of the vendor website, and in particular, a list of items. Before display to the user, the web server calls or otherwise executes a list ordering module 180 that orders the list that is to be displayed so that the most relevant items in the list are displayed to the user at the top of the list. The list ordering module takes as input the context in which the items are to be considered and a list of items that are to be ordered. The list ordering module returns an indication of the order in which the items should be listed for the particular context.

Figure 4:
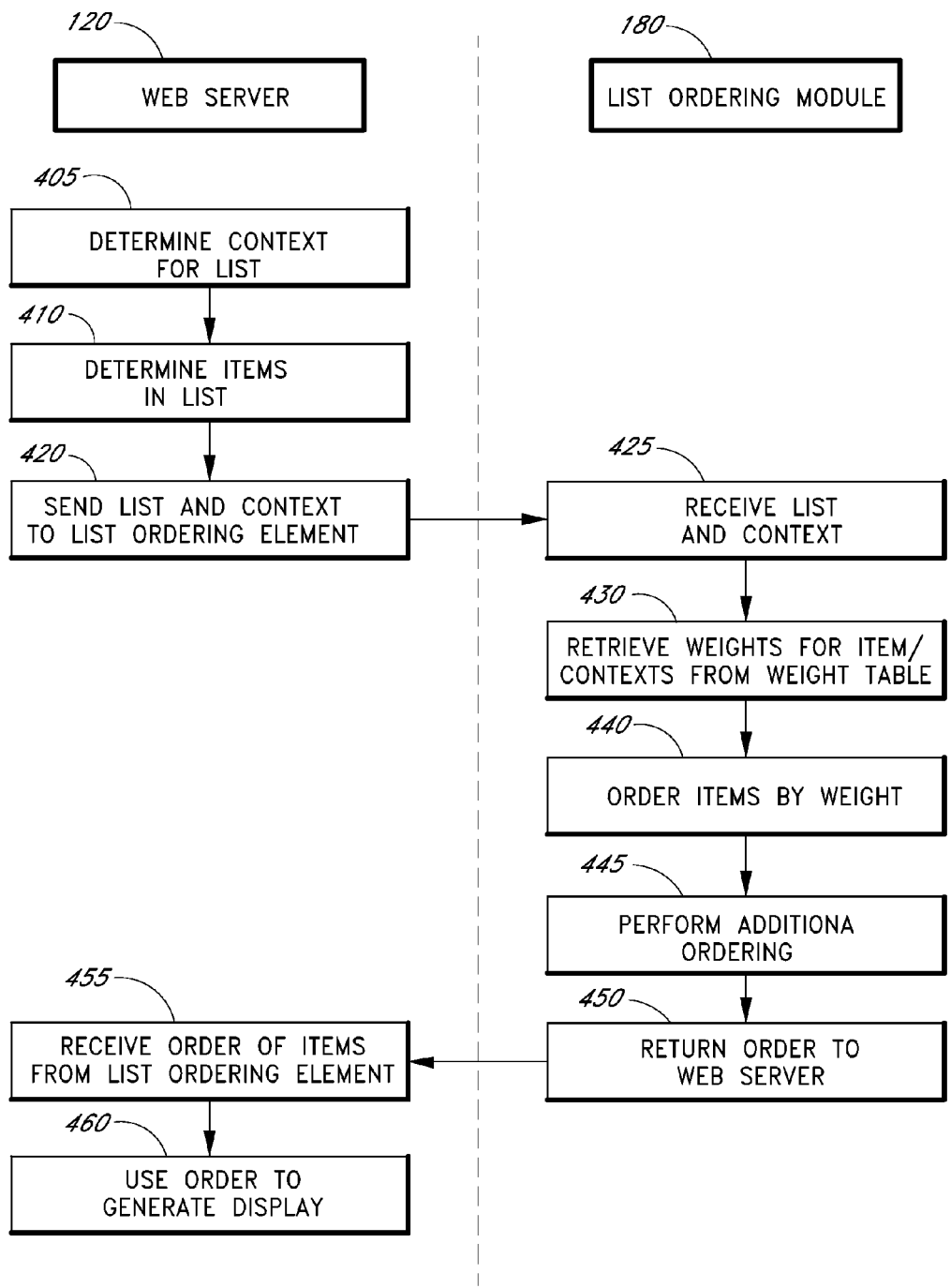
FIG. 4 illustrates a process for a web server to request the ordering of a list of items for display from a list ordering module.

The preferred process for selecting, ordering, and displaying a list is shown schematically in FIG. 4. As shown in FIG. 1B and mentioned above, the list ordering module may be a separate component from the web server 120, or may be internal to the web server. Those skilled in the art, however, will recognize that the operation of the list ordering module is substantially the same regardless of its location within the system.

Initially, the web server 120 will receive a request for a display of items matching a particular request from a user. Such a request may, for instance, be for items related to a particular link the user has selected. The request for items may also be generated by requesting items that are similar to a list of items that are being viewed by the user. Those skilled in the art will recognize that any technique that generates a list of items, whether products or other items (such as authors or sub-lists) may be used to produce a list suitable for ordering based upon context. At a step 405, the user request determines the context that will be used to determine the list order. As discussed above, the context is recorded and tracked via the display tracking service 130 and query log analysis services 145 systems.

When the list request is received, at a step 410 the web server determines the content that matches the request and prepares a list of items that fit within the request. Typically, the list of items that is generated is greater than number of items that may be readily displayed on the browser display without scrolling. At a step 420, the context and the list of items to be displayed are passed to the list ordering module 180.

At a step 425, the list ordering module receives the context and the list of items and begins the necessary processing to generate an appropriate list order. At a step 430, the appropriate weights for the items are retrieved from the weight table 170 by matching the context and item identifiers with the appropriate entries in the weight table. While the weight table 170 need not be stored within the same machine as either the web server 120 or the list ordering module 180, it is necessary for the list ordering module to have access to the weight table in order to perform the appropriate ordering function.

Once the weights are retrieved for each of the items in the list, the items may be sorted. In a preferred embodiment, at a step 440 the items are sorted by the retrieved weights. Items that have no corresponding weights in the weight table (i.e., they have not yet appeared within this context) may be placed by default at a position in the middle of the list, or distributed somewhat randomly. At a step 445, some additional ordering of the list may optionally be performed. For example, one or more items may be randomly moved within the list to ensure that even seldom selected items get some exposure.

Those of skill in the art will also recognize that the list may be ordered using a combination of weighting and randomization. In an alternate embodiment, the ordering or weighting may also be used to eliminate those items which are weighted below a certain threshold value. Those of skill in the art will recognize that there are a variety of ways in which one may order or modify the list based at least in part upon the context sensitive weight of the items other than a purely weight-ordered list.

Once the list is ordered, at a step 450 the list items are returned to the web server in the order calculated. At a step 455, the web server may then apply one or more rules that further specify how the list should be displayed. For instance, the web server might be programmed to generate web pages listing only the first twenty items of lists with more than twenty entries, or may be programmed to filter out items the user has already purchased. Once the appropriate web page is generated, it is delivered to the user's browser for display at a step 460.

5. Variations

In addition to the preferred embodiment described above, there are alternate embodiments which make use of the same general configurations of the described components, but which may use different algorithms or techniques within some of the described components.

Another alternate embodiment of the system described above is substantially similar in overall structure to the system described, but makes use of a query tracking service rather than using a query log analysis service to summarize query logs. By using a query tracking service, the query log analysis service can be eliminated and processing may be performed substantially in real-time.

In one alternative embodiment, a query tracking service may comprise a module similar to the display tracking service described above. The query tracking service is a process which is used to track the activities being performed by various visitors to the web site. The activity of each user and the context in which that activity occurs is noted and recorded as it occurs in a database. This database may be substantially the same as the activity database that is produced by the query log analysis service as described above. As discussed with respect to the display tracking service above, the query tracking service may be implemented as a process which receives messages from the web server indicating the type of activity which has been performed by the user, as well as the context within which that activity was performed Furthermore, as discussed above, it may be possible to have multiple query tracking services running simultaneously and feeding data to the same database of information. In this way, it is possible to have multiple web servers processing queries, but to have the results of activities performed placed into a single database or activity database for usage. As noted above, the data contained in such a database is substantially the same as the data which would appear in the activity database; however, rather than being produced by delayed analysis of data which was collected earlier, the activity database data may be maintained in a useful format in real-time or near real-time.

The functions performed by the query tracking service are preferably substantially similar to the functions performed in the creation of the query logs by the web servers and the summarizing of the query logs by the query log analysis service. However, by providing a tracking service which processes the incoming data in real time, the summaries are available substantially in real time, rather than being prepared only periodically by the query log analysis service. In this way, it is possible for the weighting function to be run at any time without the need for the query log analysis to be performed first. The ability to generate weights on a more frequent basis allows rapidly evolving trends to be captured and reflected in the web site's output more promptly.

The embodiment described above for the weighting service provides one technique for addressing the issue of generating appropriate levels of data for items without extensive display history. By using different algorithms based upon the total exposure of the context/item combination, items with low exposure can be provided with enough additional exposure to provide meaningful data to the weighting service and allow for more effective measurement of the interest in the item within that context. Those of skill in the art will recognize that it is also possible to alter the basis for the placement of low exposure items within the list in a variety of ways in order to generate meaningful exposure data. Furthermore, this exposure based system could be enabled only for a portion of the visitors to the web site in order to generate exposure data while still allowing most users to see the items in their calculated order.

Another alternate embodiment of the list ordering system described herein may make use of essentially the same steps, but distribute them differently within the various modules. For instance, certain preprocessing may be done in the query log analysis service 145 in order to simplify the later calculations performed by the weighting service 160. As an example, if the algorithm used in FIG. 3 above is used, it is possible that the query log analysis service may prepare an activity index and store this index in the activity database 155 rather than storing the individual activity for each of various categories of tracked activity for a particular item/context combination.

In this way, less data need be stored within the activity database 155 prepared by the query log analysis service 145. Furthermore, the weighting service 160 may then simply read the activity index directly from the activity database 155 rather than performing calculations to derive the current activity index. Particularly if there is a low load on the hardware on which the query log analysis is run, and there is a need to minimize the processing load associated with the weighting service 160, such an alternate embodiment may be used to streamline the operation of the overall system. Those of skill in the art will recognize that a variety of such techniques may be used in order to best take advantage of the available processing power and latency requirements of the system, without altering the fundamental nature of the system described.

In other alternate preferred embodiments of the described systems and techniques, different values may be used for the constant alpha within the equations above. Because this constant represents effects that are modeled based upon real world conditions (e.g. the rate at which interest decays in currently popular items, the amount of historical significance past popularity has in predicting future popularity, etc.), these values may occasionally require adjustment. In additional to periodic reevaluation of such factors in order to tune the behavior of the ordering system, in alternate embodiments this value may be assigned based upon certain objective factors, such as the type of item with which the factor is associated (e.g. book, music or video), or the cost of the item. These and such other adjustments as are known to those of skill in the art will allow for more effective ordering of the lists by the system.

In addition to the general ordering techniques described above, the list ordering module 180 may also be configured to perform additional filtering or ordering calculations based upon other information. For instance, in one alternate embodiment, the list ordering module also has access to an inventory database that provides an indication of which items are currently in stock and what the approximate lead time is for items that are out of stock. The inventory information is used to prioritize certain lists based not only on the likelihood that a user will want to purchase an item, but also based upon the availability of the item. In this way, items that are available for immediate shipment may appear higher on the list.

The query logs may also include, for each list viewing event, information about whether the user selected the 'View Similar Items' link with respect to any of the items in the list. If a 'View Similar Items' link was selected, the query log also preferably includes information about any actions (e.g., item viewing events, shopping cart adds, wish list adds, purchases, etc.) performed by the user with respect to the displayed similar items. Through the use of the 'View Similar Items' function, display and activity tracking data may be collected in various contexts for the similar items that were not part of the list as it was initially populated. For instance, a list of "Gifts for Graduates" may be initially populated with items that are manually selected by an online merchant, and/or may be populated automatically based on a seeding algorithm. Over time, in addition to data being collected about the items already in the list, context, exposure and activity data may also be collected for those similar items that appear in subsequent lists produced in response to users choosing to 'View Similar Items' for various items on the "Gifts for Graduates" list. For example, the merchant might have initially included the book "Everything I Needed to Know I Learned in Kindergarten" in the "Gifts for Graduates" list. As this list is presented to users over time, some users may opt to 'View Similar Items' to this particular book. A variety of similar items (typically other books) will be displayed in response to this selection, and some users may perform one or more types of activities with respect to the similar items—such as by viewing, purchasing, or adding one or more of the similar items to a wish list. Each of these activities is tracked and recorded in the activity database.

Once the activity tracking data for similar items has been collected, the data may be used to automatically refine the contents of the list. Even though the similar items typically are not part of the initial "Gifts for Graduates" list, they may be added to the list as the result of activity and exposure data collected through this process. As time goes by and the weighting service is run to generate appropriate weights to use in ordering the items in the list, weights may be generated for similar items that were not part of the original list. The list ordering service can use the weights of the similar items to determine whether or not to add any of the similar items to the list. For example, once the exposure level of a particular similar item exceeds a selected threshold value, the similar item may be added to the list based upon its weight. In this way, new items that may not have been initially recognized as being likely to generate interest within a particular context may be added to the list of items displayed to a user in that context.

6. Example Applications

The above techniques and systems may be useful in a variety of applications in which lists of items, such as products, are presented to a user based upon differing contexts. Example applications that make use of such techniques and systems are described below.

One particular embodiment is a "gift wizard" system in which each of a plurality of browsable gift-context-specific lists evolve over time (i.e., change in content) to reflect the actions of those who view that list. One example of a gift-context-specific list is a "Gifts for Graduates" list, as mentioned above with reference to FIG. 1A. A particular merchant might initially populate this list with items corresponding to this context by hand and/or through the use of an automated selection/seeding algorithm. These items need not be limited to any particular category and may include a variety of items such as apparel, books, music, videos and so forth. In addition, there need not be any particular association with graduation or school in any particular item; for instance, the merchant may simply have noted that picture frames seem to sell especially well during May and June each year.

Once an initial list is created and given a user-viewable gift context name (such as "Gifts for Movie Buffs"), the display tracking service and query logs may be used as described above to develop the appropriate databases of exposure and activity information associated with each item displayed within this context. As addressed above, data associated with additional items which were not originally included in the list may also be tracked when such items are displayed in response to users selecting to 'View Similar Items' to any particular item displayed in the list.

When the weighting service is run, weights for each of the displayed items are produced based upon the activity of the various users who viewed the list. As discussed above, this may include weights for items not originally included in the list when it was set up by the merchant. Based upon these weights and the threshold values chosen for use in the weighting and list ordering algorithms, the list of items the is displayed to the user when viewing items within the "Gifts for Graduates" context may evolve over time. Thus, the item weights may be used both to select the items to displayed to users, and to determine the order in which the displayed items are to be presented.

Such evolution may be advantageous in allowing additional items not originally recognized as having particular value within the context to be brought to the attention of users. Similarly, items that were initially included on the list but have been performing relatively poorly in terms of the tracked user activity will naturally tend to move down the list. By placing an upper limit on the number of items to be included in any particular display of the list, items may effectively be removed from the list if they are weighted below non-original items automatically added to the list.

Note that although the application above is described in terms of a "gift wizard," such an application may be used beyond the confines of gifts. For instance, such an evolving list of items may be used for specialty stores related to particular genres of music, film or literature, as well for broad categories of interest that are not easily identified. Another application that can make use of the techniques and systems described herein makes use of a list which may desirably remain static, unless explicitly changed by the operator of the system. For example, online sales systems commonly include a "browse tree" through which users can browse the various catalog items (products) based on predefined item categories and subcategories. See, e.g., U.S. Pat. No. 6,466,918, the disclosure of which is hereby incorporated by reference. A given category within the tree in the form of a browse node that includes a list of all items falling within that category. In accordance with the invention, the display order (but not the content) of each such list is modified over time to reflect the actions of those who view the list. Thus, for example, the display order of the list associated with the browse node "sports\olympics\videos" may change over time based on user actions performed during viewing of this list, without regard to other user actions performed on the items within this list.

Such a system may be useful when a list is categorically based. For instance, a list which includes all country music within the population of available items might be kept without allowing for the possibility of the list itself evolving over time. This is because users who are browsing a list entitled "Country music" will generally not expect to find items on the list other than country music items. Such arrangements may also be useful when a list is limited to a particular category which only changes slowly over time. For example, the collection of Star Trek books might be handled using such a static browse node application. Although there are hundreds of books in this category by a variety of authors, there is no need to let this list change except for when a new Star Trek book is released.

The various embodiments described above in accordance with the present invention thus provide a system and technique to provide a prioritized order to a list of items for which user activity data and context have been tracked. By using this data to estimate the level of interest in the items within the various display contexts, a list may be ordered, and optionally modified in content, so as to emphasize items which are most relevant in the list's context.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Furthermore, the skilled artisan will recognize the interchangeability of various features from different embodiments. In addition to the variations described herein, other known equivalents for each feature can be mixed and matched by one of ordinary skill in this art to construct list ordering or prioritizing systems in accordance with principles of the described system.

Although the systems and techniques above have been disclosed in the context of certain preferred embodiments and examples, it will be understood by those skilled in the art that these techniques and systems extend beyond the specifically disclosed embodiments to other alternative embodiments and/or uses, including obvious modifications and equivalents thereof.

What is claimed is:

1. A computer-implemented method of discovering items associated with particular contexts, the comprising:

outputting, for presentation to each of a plurality of users, a context-specific list of items in which each of a plurality of items on the list is presented together with a respective control for initiating a display of similar items, said context-specific list corresponding to a particular context, said particular context being one of a plurality of defined contexts in which items are capable of being displayed;

recording, in association with the particular context, user activity associated with user selections of the controls for initiating displays of similar items, said user activity including user selections of particular similar items, wherein recording said user activity comprises recording an indication that said user selections of similar items were made in association with said user selections of the controls for initiating displays of similar items; and determining whether the recorded user activity associated with a similar item is sufficient to add the similar item to the context-specific list, said determining comprising calculating a weight value for the similar item, and using the weight value to determine whether to add the similar item to the context-specific list, said weight value revealing a degree to which the similar item is associated with the particular context;

said method performed by one or more computers of a multi-user interactive system.

2. The method of claim 1, wherein the weight value is dependent upon (1) the recorded user activity associated with the similar item, and (2) a number of times the similar item has been exposed in association with the particular context.

3. The method of claim 1, further comprising recording exposure events in which the similar item is exposed for viewing as a result of user selections of said controls, and taking the recorded exposure events into consideration in determining whether the recorded user activity is sufficient to add the similar item to the context-specific list.

4. The method of claim 1, wherein outputting the context-specific list comprises outputting the list together with a textual identifier of said particular context.

5. The method of claim 1, wherein the items are products represented in an electronic catalog, and the particular context is a particular gift-giving context that is selectable by users.

6. The method of claim 1, further comprising recording, in association with the particular context, user activity data for each of the items on the context-specific list, and using said user activity data for each of the items to determine whether to remove any of the items from the context-specific list.

7. The method of claim 1, further comprising recording, in association with the particular context, user activity data for each of the items on the context-specific list, and using said user activity data for each of the items to rank the items for presentation on said list.

8. The method of claim 1, wherein determining whether the recorded user activity is sufficient comprises giving different amounts of weight to different types of user actions performed in connection with the similar item.

9. The method of claim 1, further comprising responding to user selection of said control, as displayed together with a first item on said list, by outputting a list of items that are purchased by users who purchase the first item, as determined from recorded purchase histories of users.

10. The method of claim 1, further comprising responding to user selection of said control, as displayed together with a first item on said list, by outputting a list of items that are viewed by users who view the first item, as determined from recorded item viewing activities of users.

11. A computerized system capable of discovering items associated with particular contexts, the system comprising:
a server system that is responsive to page requests received over a network from user computing devices by outputting pages that include a context-specific list of items, and that include display elements that are selectable by users to initiate displays of corresponding similar items, said context-specific list corresponding to a particular context among a plurality of defined contexts in which items are capable of being displayed, said server system comprising a processor;
an activity tracking system that maintains, in association with the particular context, user activity data reflective of user selections of particular similar items from said displays of similar items, said user activity data stored with an indication that said user selections of the similar items were made in association with user selections of said display elements; and
a list refinement system that uses the user activity data to identify particular similar items to add to the context-specific list, said list refinement system comprising an item weighting service that generates item-specific weights for particular similar items, wherein an item-specific weight for a similar item reveals a degree to which the similar item is behaviorally associated with a particular context, wherein the list refinement system uses the item-specific weights to select particular similar items to add to the context-specific list.

12. The system of claim 11, further comprising an exposure tracking system that tracks exposure events in which particular similar items are exposed as a result of user selections of said display elements, wherein the list refinement system uses the tracked exposure events, in combination with said user activity data, to select particular similar items to add to the context-specific list.

13. The system of claim 11, wherein the activity tracking system maintains context-specific user activity data for each of the plurality of defined contexts, and the list refinement system uses the context-specific user activity data to refine context-specific lists corresponding to each of said contexts.

14. The system of claim 11, wherein the items are products represented in an electronic catalog, and the particular context is a particular gift-giving context that is selectable by users.

15. The system of claim 11, wherein the activity tracking system tracks a plurality of different types of item selection actions performed by the users, and the list refinement system gives different amounts of weight to different types of item selection actions.

16. The system of claim 11, wherein the server system generates said displays of corresponding similar items based at least partly on purchase-based relationships between items.

17. The system of claim 11, wherein the server system generates said displays of corresponding similar items based at least partly on item-viewing-based relationships between items.

18. The system of claim 11, wherein the list refinement system additionally removes items from the context-specific list based on user activity data maintained by the activity tracking system.

19. The system of claim 11, wherein the list refinement system. additionally determines a display order for displaying the items on the context-specific list, said display order being dependent upon user activity data maintained by the activity tracking system.

20. Physical, non-transitory computer storage that stores executable code modules that instruct one or more computers to perform a method that comprises:
outputting, for presentation to each of a plurality of users, a context-specific list of items in which each of a plurality of items on the list is presented together with a respective display element for initiating a display of similar items, said context-specific list corresponding to a particular context, said particular context being one of a plurality of defined contexts in which items are capable of being displayed;
recording, in association with the particular context, user activity associated with user selections of the display elements, said user activity including user selections of particular similar items, said user activity recorded with an indication that said user selections of similar items were made in association with said user selections of the display elements for initiating displays of similar items; and
determining whether the recorded user activity associated with a similar item reveals a sufficient level of association between the particular context and the similar item to add the similar item to the context-specific list, said determining comprising calculating a value representing a strength of an association between the similar item and the particular context, and using the value to determine whether to add the similar item to the context-specific list.

21. The physical computer storage of claim 20, wherein the method further comprises recording, in association with the particular context, user activity data for each of the items on the context-specific list, and using said user activity data for each of the items to determine whether to remove any of the items from the context-specific list.

22. The physical computer storage of claim 20, wherein the method further comprises recording, in association with the particular context, user activity data for each of the items on the context-specific list, and using said user activity data for each of the items to rank the items for presentation on said list.

23. The physical computer storage of claim 20, wherein the value is dependent upon (1) the recorded user activity associated with the similar item, and (2) context-specific exposure data reflective of how many times the similar item has been exposed to users in association with the particular context.

24. The physical computer storage of claim 20, in combination with a computer system that comprises said one or more computers, the computer system programmed with the executable code modules to perform said method.

* * * * *

UNITED STATES PATENT AND TRADEMARK OFFICE
CERTIFICATE OF CORRECTION

PATENT NO.         : 7,953,739 B2
APPLICATION NO.    : 12/843705
DATED              : May 31, 2011
INVENTOR(S)        : Jeremy C. York, Robert Cottrell and Brent Smith It is certified that error appears in the above-identified patent and that said Letters Patent is hereby corrected as shown below:

ON THE TITLE PAGE:

Item (56), in the third line of the "OTHER PUBLICATIONS" section, change "onArtificial" to --on Artificial--.

IN THE CLAIMS:

At col. 18, line 39, Claim 19 (approx.; the second line of claim 19), change "system." to --system--.

Signed and Sealed this
Twenty-ninth Day of November, 2011

David J. Kappos
*Director of the United States Patent and Trademark Office*